United States Patent [19]

Rafipour

[11] Patent Number: 4,554,647

[45] Date of Patent: Nov. 19, 1985

[54] METHOD FOR MEASURING SEISMIC PHASE SHIFT OF COMPRESSIONAL WAVEFORMS

[75] Inventor: Bijan J. Rafipour, Dallas, Tex.

[73] Assignee: Mobil Oil Corporation, New York, N.Y.

[21] Appl. No.: 438,206

[22] Filed: Nov. 1, 1982

[51] Int. Cl.$^4$ .............................................. G01V 1/28
[52] U.S. Cl. ...................................... 367/48; 367/40
[58] Field of Search ...................... 367/38, 40, 48, 59, 367/63, 73, 47; 364/421

[56] References Cited

U.S. PATENT DOCUMENTS 3,836,952 9/1974 Johnson ............................... 367/48

OTHER PUBLICATIONS

"Bright Spot in the Energy Picture" Ocean Industry, Article, Feb. (1974), pp. 60–65.
Choy et al., "Pulse Distortion and Hilbert Transformation in Multiply Reflected and Refracted Body Waves," Bulletin of the Seismological Society of Amer., vol. 65, No. 1, pp. 55–70, Feb. (1975).

Primary Examiner—Salvatore Cangialosi
Assistant Examiner—K. R. Kaiser
Attorney, Agent, or Firm—A. J. McKillop; Michael G. Gilman; George W. Hager, Jr.

[57] ABSTRACT

Seismic pulse waveforms are generated for travel through subsurface formations. Both normally-reflected and obliquely-reflected waveforms from subsurface interfaces are recorded. The differential phase change between the normally-reflected and obliquely-reflected waveforms are determined for each interface. The fluid characteristics of the porous subsurface layers are identified as gas-saturated or water-saturated in response to the relative amounts of phase change, a gas-saturated layer providing a larger phase change than a water-saturated phase change.

2 Claims, 10 Drawing Figures

COMMON DEPTH POINT (CDP) TRACES

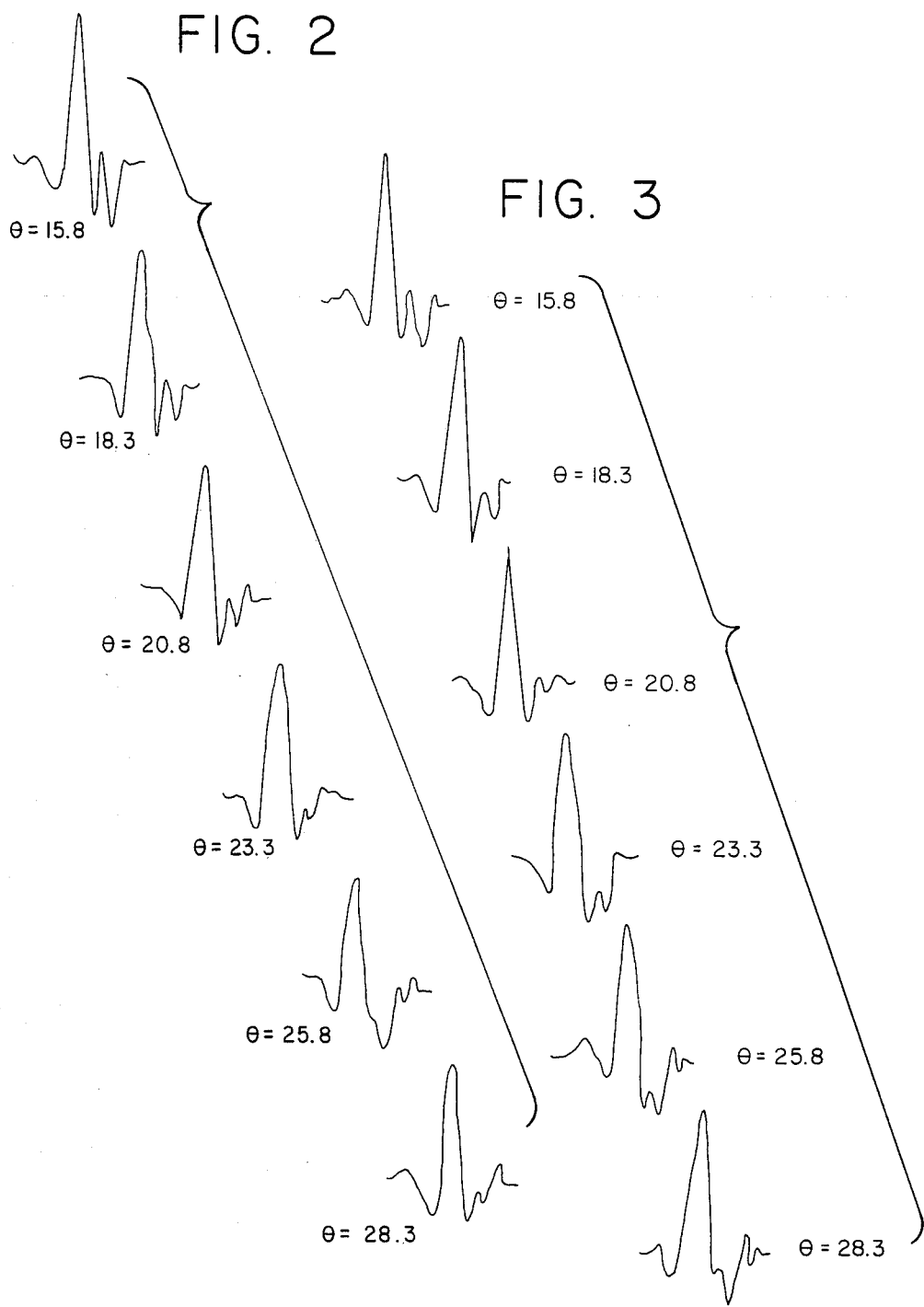

METHOD FOR MEASURING SEISMIC PHASE SHIFT OF COMPRESSIONAL WAVEFORMS

BACKGROUND OF THE INVENTION

This invention relates to the processing of seismic data to render it more useful in interpreting the seismic characteristics of the earth in the exploration for oil and gas deposits.

In seismic prospecting a seismic energy source is employed to generate a seismic signal which is transmitted into the earth. A portion of this signal is reflected from reflecting interfaces within the earth back toward the surface of the earth where it is received by detector stations positioned to receive the reflected signals. There are many different types of seismic energy sources employed in seismic prospecting. In general, these energy sources may be classified in two general classes, those by which an impulse signal is transmitted into the earth, and those by which vibrational energy is transmitted by a continuous or semicontinuous process into the earth. The detector stations are usually comprised of a group of geophones which generate electrical signals in response to received seismic signals. The geophones are electrically connected with seismic recording instruments for recording the electrical signals. A recording of one seismic channel is referred to as a trace or seismic trace. When the trace is recorded in analog form on a magnetic tape there is a continuous record written on the tape of an output voltage of a seismic amplifier used in conjunction with the recording of the electrical signals generated by the geophones. When processed in analog form these electrical signals are operated upon for example by filtering to present them in form for use by geophysicists. With the digital recording of seismic data a discontinuous record of the signal is written that measures the seismic amplifier output voltage only at discrete intervals. The digitally recorded data may be operated upon to present the data in form for use by geophysicists. Reference may be had to "A Pictorial Digital Atlas", 1966 Edition, prepared by Staff Members of United Geophysical Corporation, and presented at the 36th Annual Meeting of the SEG, Houston, Tex., November 1966, for a better understanding of digital recording and analysis and processing of seismic signals.

SUMMARY OF THE INVENTION

The fluid characteristics of the earth's layerings give rise to unique seismic reflections having identifiable phase characteristics. The present invention is directed toward a method for measuring such phase characteristics.

Seismic compressional pulse waveforms are generated and applied to the subsurface formations. The phase shift of the compressional pulse waveforms are recorded as they reflect normally from subsurface formation interfaces. The phase shifts are also recorded as the compressional pulse waveforms reflect from the subsurface formation interfaces at a plurality of oblique angles. The phase shifts attributable to normal reflection are subtracted from the phase shifts attributable to oblique reflections to determine the amount of phase change observable for each incremental oblique angle. Porous subsurface layers are identified as either gas-saturated or water-saturated based on the relative amounts of phase change, a gas-saturated layer producing a greater phase change in the reflected pulse waveform than a water-saturated layer.

BRIEF DESCRIPTION OF THE DRAWINGS

FIG. 2 illustrates recorded pulse waveforms reflected from the interface (upper boundary) of a gas-saturated porous layer.

FIG. 3 illustrates recorded pulse waveforms reflected from the interface (upper boundary) of a water-saturated porous layer.

DESCRIPTION OF THE PREFERRED EMBODIMENT

The objective in hydrocarbon exploration is to be able to determine the lithology (rock type) and porosity, and to distinguish accurately between gas, oil, and water bearing formations in the upper crust. The variation of amplitude and phase on reflection, caused primarily by variation in the lithology and fluid content of rocks, contains information that can be used as a diagnostic feature of their presence. A variation in rock properties, porosity and pore fluid, however, cannot be simulated very satisfactorily in the laboratory. Moreover, due to inability to measure phase shift on a laboratory scale, the significance of the effects of shift of phase upon reflected waves has been neglected by exploration seismologists. Thus, experimental and theoretical work related to reflection and phase change at the boundary of a porous medium for non-normal incidence, is limited and an appropriate relationship between the seismic parameters and phase shift is not well established. It is therefore a specific aspect of the present invention to measure variations of phase on reflection as a function of frequency, at the interface of a saturated porous medium, with oblique incidence.

Figure 1:
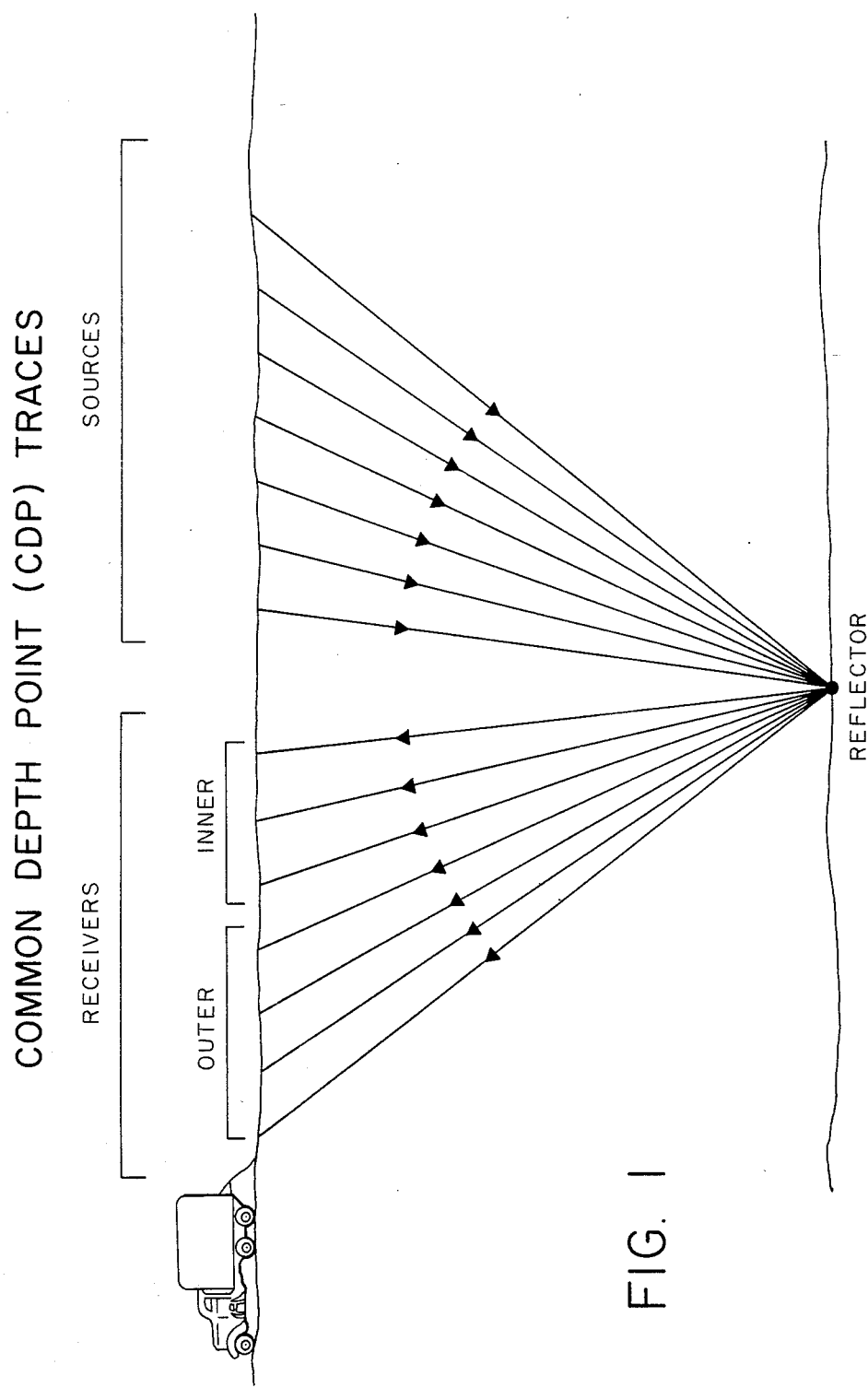
FIG. 1 illustrates a conventional seismic field data gathering system for use in the present invention.

In seismic exploration the angle of incidence of the reflected seismic waves usually departs from the vertical, as seismic sources and receivers are located at some distance from each other as shown in FIG. 1. For incident angles greater than zero (i.e. nonnormal incidence), the shape of the waveform changes, the reflection coefficient becomes more complicated, and phase change occurs.

The phase shift has been found to be a sensitive function of incident angle, and is further dependent on fluid saturation and frequency. At the interface of a water saturated porous medium, phase shift increased in a more negative direction than in gas-saturated case. This indicated that in general, a gas saturated porous medium can give rise to a drop in P-wave velocity, and hence, an increase in phase shift. This information is used in accordance with the present invention to distinguish between gas-bearing and water-bearing porous layers, as well as prediction of major structures and lithology.

The purpose of seismological investigations, in general, is to reveal lithology and structure of subsurface formations. The data obtained from seismic reflection methods are commonly used to map the structure of subsurface formations which are associated with accumulation of hydrocarbons or mineral deposits. Reflection data have also been used for identifying litholoy, velocity, and attenuation characteristics. Usually one assumes that the earth is perfectly elastic. However, seismic waves are damped (attenuated) during propagation which indicates that the earth is not a perfectly elastic body. Elastic materials are those which have the capacity to store mechanical energy with no loss of the energy. Viscoelastic materials, by definition, are solids which do not have the capacity to store the energy, and when a stress is applied to a unit volume, a strain results which is "irreversible".

There are two important factors which control the percentage of the seismic wave energy which is reflected at an interface of layers with different elastic constants, i.e., different density and velocity. These two factors are first the acoustic impedances (density×-velocity) of the materials on both sides of the interface and second, the angle of incidence of the incident wavelet. At normal incidence the amplitude reflection coefficient (reflectivity) is simply equal to the ratio of the reflected wave amplitude over the incident wave amplitude, and is a function of the acoustic impedances. However, this relation becomes more complex where the incident wavefront is not perpendicular to the boundary. In the case of oblique incidence, four types of waves are generated. The transmitted and reflected waves contain both shear as well as compressional waves. At normal incidence no shear waves are generated; hence, there is no coupling betwen P- and S-waves.

In seismic exploration the angle of incidence usually departs from the vertical, as seismic sources and receivers are located at some distance from each other. For oblique incident angles, the shape of the reflected and transmitted waveforms changes, the reflection coefficients relationship becomes more complicated and phase change occurs. To determine the change (distortion) in the shape of the propagating pulse, the pulse form can be expressed in terms of its complex frequency spectrum. Change in pulse form with distance traveled can be caused either by a change in its amplitude or its phase spectrum.

The relationship of phase change, of compressional waveforms, at an interface of a horizontally layered porous medium, as a function of fluid saturation, angle of incidence, and frequency is used in accordance with the present invention to distinguish between gas and water saturation.

The phase shift of compressional pulse waveforms reflected normally from the interface of a porous layer is small at frequencies up to about 80 kilohertz. For oblique incident angles, the reflection coefficients relationship becomes complex and increased phase shift takes place.

Figure 4:
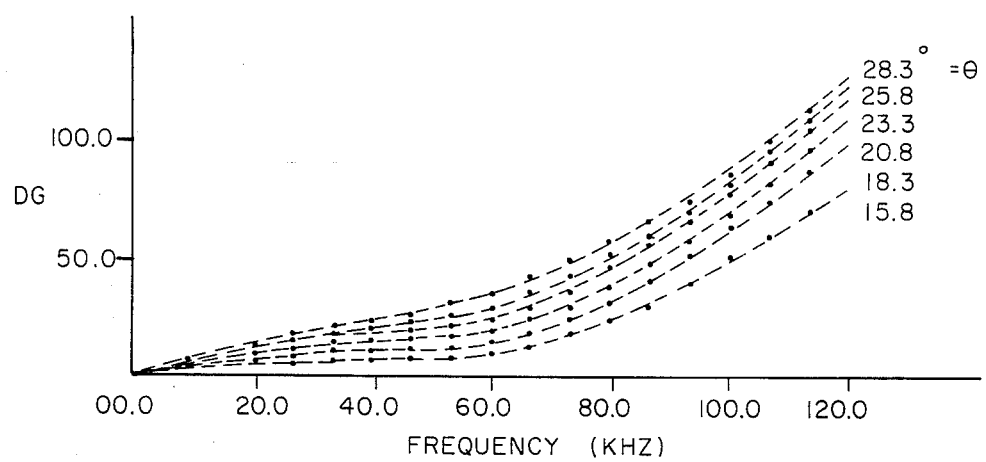
FIG. 4 illustrates the observed phase shift of the recorded pulse waveforms of FIG. 2 at the interface of a gas-saturated porous layer with oblique incidence.
Figure 5:
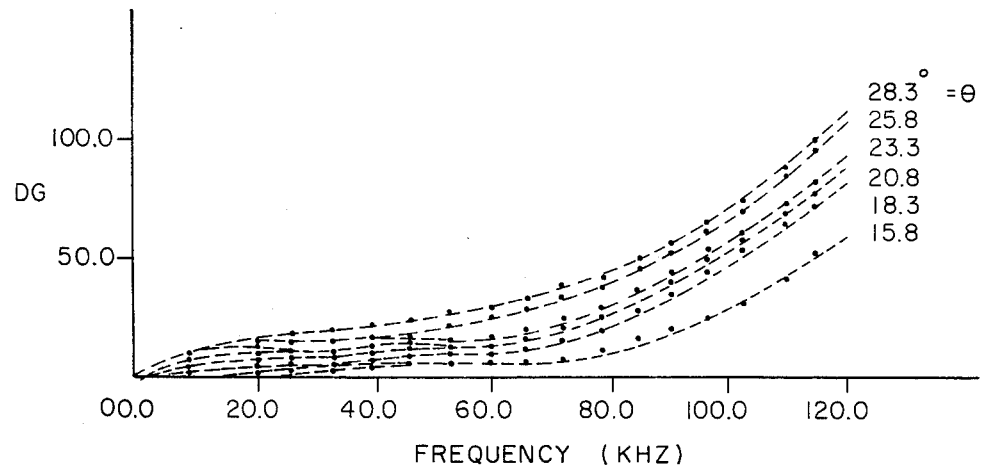
FIG. 5 illustrates the observed phase shift of the recorded pulse waveforms of FIG. 3 at the interface of a water-saturated porous layer with oblique incidence.

Referring now to FIGS. 2 and 3 there is shown the observed phase shift for nonnormal or oblique reflected compressional waves from the interface of a porous layer saturated with gas and water respectively due to a change in the angle of incidence. In such FIGS. 1 and 2 the total angle of incidene $\theta$ is increased in increments of 2.5°, i.e., $\theta = 15.8, 18.3, 20.8, 23.3, 25.8$ and 28.3 degrees. By subtracting the phase shift of the normally reflected compressional pulse waveform from these non-normal or obliquely reflected compressional waveforms, the amount of phase change is determined. FIGS. 4 and 5 illustrate these observed phase changes plotted as a function of frequency for the gas and water saturations of FIGS. 2 and 3 respectively for a normal incidence of $2\alpha = 3.3°$.

In order to determine the effect of non-normal incidence on phase at the interface of the porous medium, the observed phase shifts shown in FIGS. 4 and 5 must be corrected for medium dispersion and geometric dispersion. The phase change is calculated as follows:

$$\Delta\phi_1 = \Delta x \cdot f[1/C_f - 1/C]$$

$$\Delta\phi_2 = \Delta x \cdot f[1/[C - \Delta C(f)] - 1/C]$$

$$\Delta\phi = \Delta\phi_1 + \Delta\phi_2 = \Delta x \cdot f[1/C_f + 1/[C - \Delta C(f)]]$$

where
$\Delta x$ = the differences in path length with respect to normal incidence;
$C_f$ = phase velocity measured in the porous layer;
$C(f)$ = phase velocity calculated from: $(c_1)(\operatorname{cosec}\theta)$, where $c_1$ is sound velocity through the subsurface formation and $\theta$ is the angle of incidence of the seismic pulse waveform with respect to the normal incidence at the subsurface reflecting point along the boundary with the underlying medium, i.e., Geometric Dispersion;
f = frequency;
$\Delta\phi_1$ = phase change due to medium dispersion;
$\Delta\phi_2$ = phase change due to geometric dispersion;
$\Delta\phi$ = total phase change; and
C = constant (2.38 Km/sec).

Figure 6:
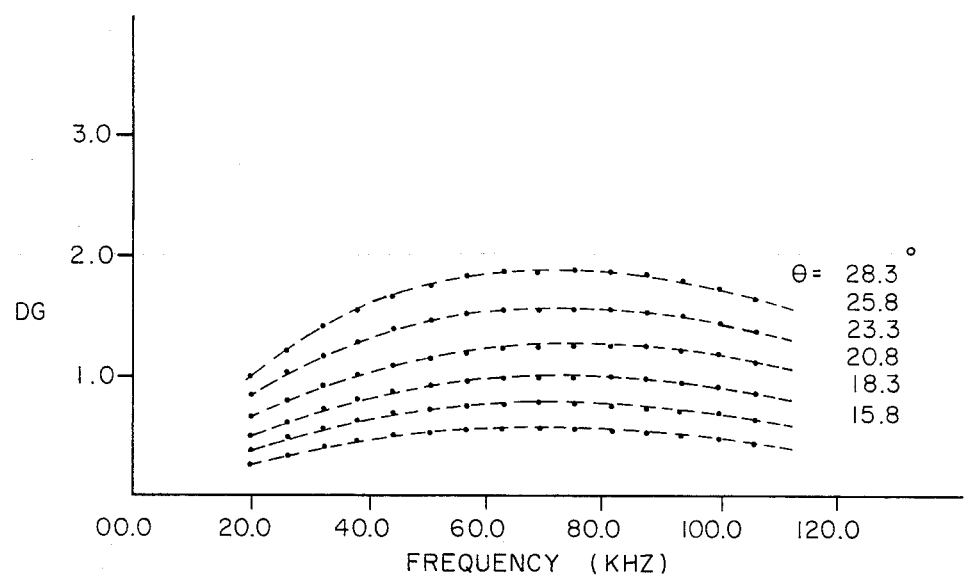
FIG. 6 illustrates the phase change which must be subtracted from the observed phase shifts of FIGS. 4 and 5 in order to correct phase shift for medium dispersion with oblique incidence.
Figure 7:
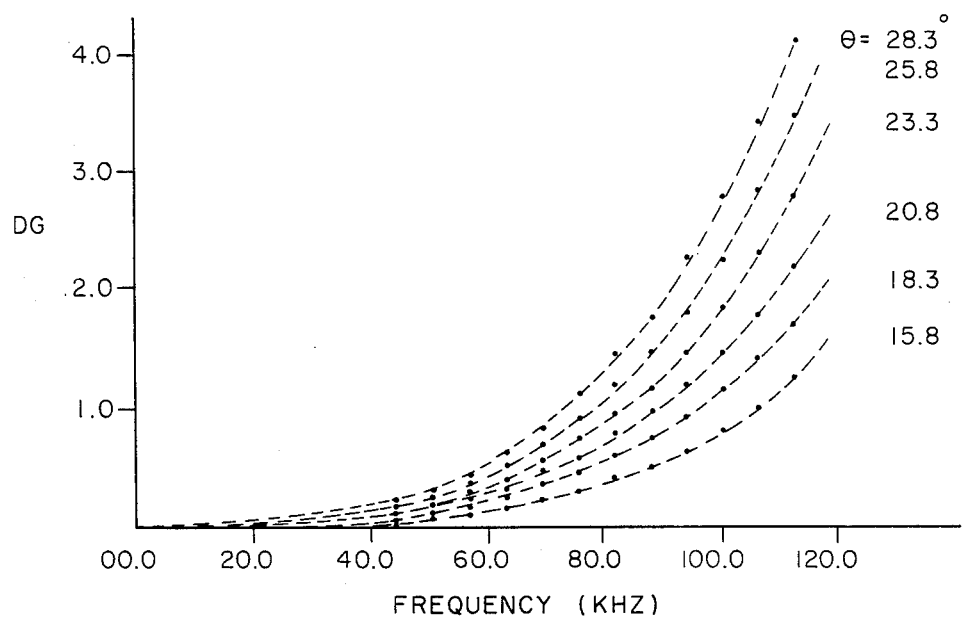
FIG. 7 illustrates the phase change which must be subtracted from the observed phase shifts of FIGS. 4 and 5 in order to correct phase shift for geometric dispersion with oblique incidence.
Figure 8:
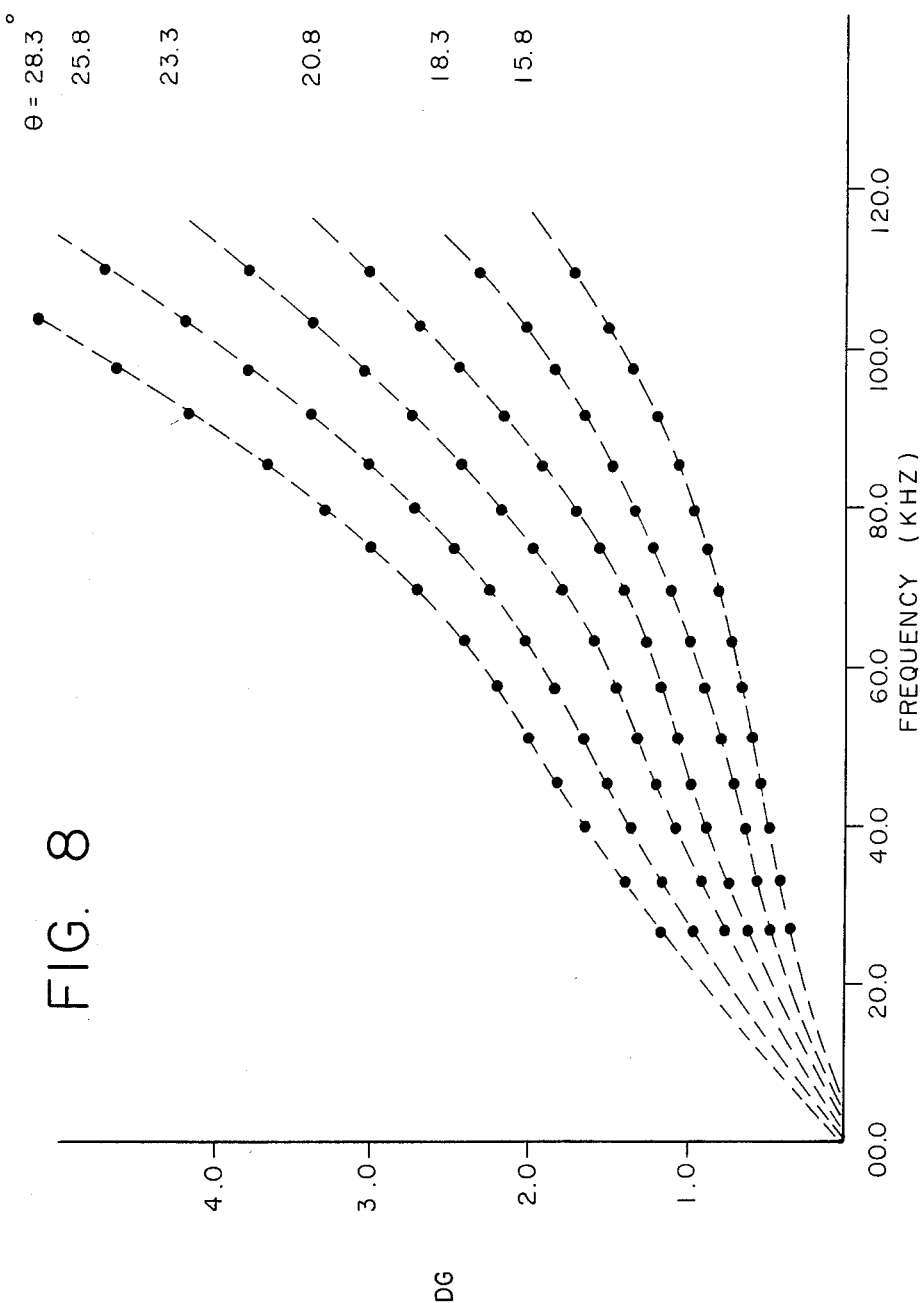
FIG. 8 illustrates the total phase change of FIGS. 6 and 7 which must be subtracted from the observed phase shifts of FIGS. 3 and 4 in order to correct the measured phase shift for angle incidence and fluid saturation.
Figure 9:
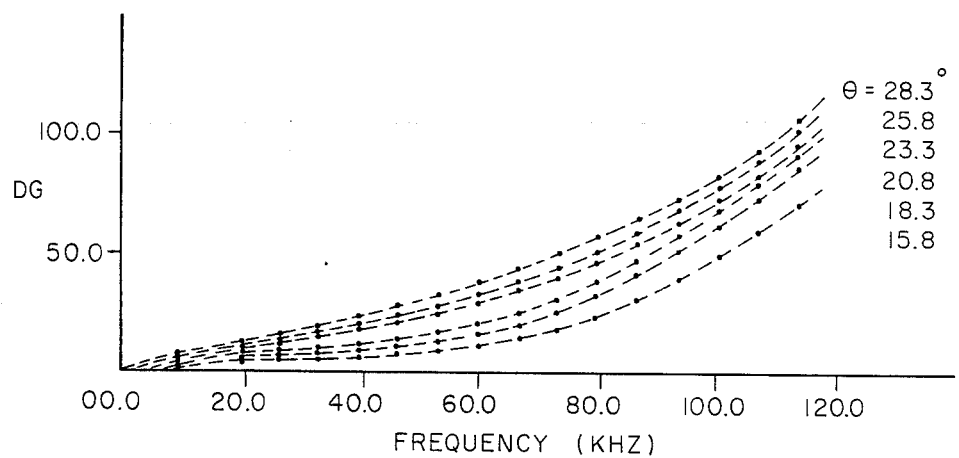
FIG. 9 illustrates the corrected observed phase shift at the interface of the gas-saturated porous layer with oblique incidence.
Figure 10:
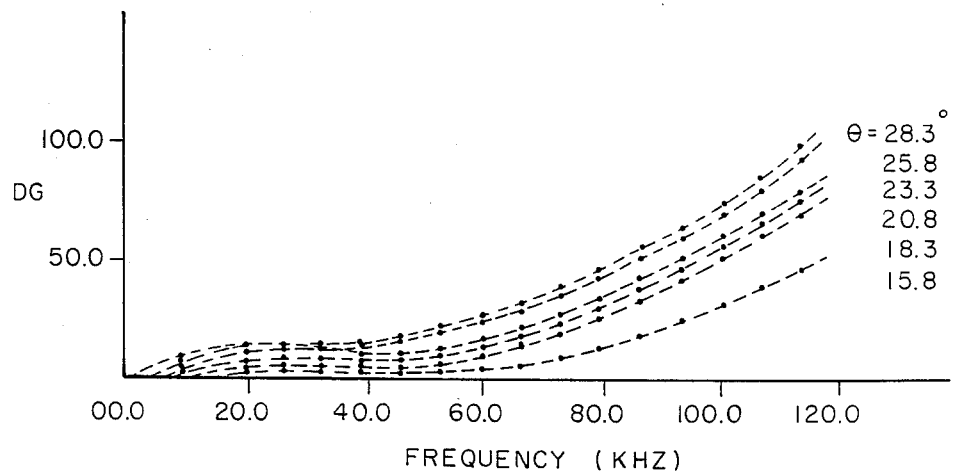
FIG. 10 illustrates the corrected observed phase shift at the interface of the water-saturated porous layer with oblique incidence.

The value of $\Delta\phi_1$ is positive for all frequencies and approaches zero for frequencies below about 20 kilohertz and for frequencies above about 120 kilohertz as shown in FIG. 6. The value of $\Delta\phi_2$ is also positive, varies gradually from near zero to about 40–60 kilohertz, and increases rapidly from about 40–60 kilohertz to above about 120 kilohertz as shown in FIG. 7. FIG. 8 illustrates a plot of the total phase change $\Delta\phi$ which must be subtracted from the observed phase changes (see FIGS. 4 and 5) at the interface in order to calculate the corrected phase shift due to the angle of incidence and fluid saturation in the porous layer. Such a corrected phase shift for both gas and water-saturated porous layers are shown in FIGS. 9 and 10 respectively. An examination of these corrected phase change values shows that there is a phase-shift of about 7 to 10 degrees for each 2.5 degrees increment of total angle of incidence at midband frequencies for the gas-saturated case and about 5 to 8 degrees for each 2.5 degrees increment of total angle of incidence at midband frequencies for the water-saturated case. Both FIGS. 7 and 8 therefore show that phase change $\Delta\phi$ increases with increase in frequency for all angles of incidence. However, in the water-saturation case, FIG. 8, there is a greater negative phase change than in the gas-saturation case, FIG. 7. This indicates that the type of fluid content effects the phase shift at the interface. Therefore measured phase changes at subsurface interfaces can be utilized to distinguish gas from water-saturated porous layers.

I claim:

1. A method of distinguishing between gas and water saturation characteristics of subsurface earth formations in which the fluid characteristics of the earth's layerings give rise to unique seismic reflections having identifiable phase characteristics, comprising:

(a) generating seismic compressional pulse waveforms which travel through the subsurface earth formations, (b) recording the phase shift of said compressional pulse waveforms as they reflect normally from common subsurface reflecting points on subsurface formation interfaces, (c) recording the phase shift of said compressional pulse waveforms as they reflect at a plurality of incremental oblique angles from said common subsurface reflecting points, (d) subtracting the recorded phase shift of each of said normally reflected pulse waveforms from the recorded phase shift of those of said plurality of obliquely reflected pulse waveforms which reflect from the same common subsurface reflecting point as each of said normally reflected pulse waveforms to determine the amount of phase change observable for each incremental oblique reflection angle about each of said common subsurface reflecting points, (e) identifying subsurface porous layers having the greater phase changes attributable to the plurality of obliquely reflected pulse waveforms about each of said common subsurface reflecting points along the interfaces of said subsurface porous layers as the water saturated formations and those with the lesser phase changes as the gas saturated formations, and (f) correcting said observable phase change for formation geometric dispersion $\Delta\phi_2$ in accordance with the following $$\Delta\phi_2 = (\Delta x)(f)[1/[C - \Delta C(f)] - 1/C]$$

where
   $\Delta x$ = the difference in path length with respect to normal incidence;
   f = frequency of the seismic pulse waveform;
   C = constant (2.38 Km/sec); and
   $\Delta c(f)$ = phase velocity: $(c_1)(\text{Cosec}\theta)$, where $c_1$ is sound velocity through the subsurface formation and $\theta$ is the angle of incidence of the seismic pulse waveform with respect to the normal incidence at the subsurface reflecting point along the boundary with the underlying medium.

2. A method of distinguishing between gas and water saturation characteristics of subsurface earth formations in which the fluid characteristics of the earth's layerings give rise to unique seismic reflections having identifiable phase characteristics, comprising:

(a) generating seismic compressional pulse waveforms which travel through the subsurface earth formations, (b) recording the phase shift of said compressional pulse waveforms as they reflect normally from common subsurface reflecting points on subsurface formation interfaces, (c) recording the phase shift of said compressional pulse waveforms as they reflect at a plurality of incremental oblique angles from said common subsurface reflecting points, (d) subtracting the recorded phase shift of each of said noramally reflected pulse waveforms from the recorded phase shift of those of said plurality of obliquely reflected pulse waveforms which reflect from the same common subsurface reflecting point as each of said normally reflected pulse waveforms to determine the amount of phase change observable for each incremental oblique reflection angle about each of said common subsurface reflecting points, (e) identifying subsurface porous layers having the greater phase changes attributable to the plurality of obliquely reflected pulse waveforms about each of said common subsurface reflecting points along the interfaces of said subsurface porous layers as the water saturated formations and those with the lesser phase changes as the gas saturated formations, and (f) correcting said observed phase change for each incremental oblique angle for both medium dispersion and geometric dispersion by subtracting from said observed phase changes the total dispersive phase change $\Delta\phi$ as follows:

$$\Delta\phi = (\Delta x)(f)[1/C_f + 1[C - \Delta C(f)]]$$

where
   $\Delta x$ = difference in path length with respect to normal incidence,
   $C_f$ = phase velocity measured in the porous layer,
   $C(f)$ = phase velocity: $(c_1)(\text{cosec}\theta)$, where $c_1$ is sound velocity through the subsurface formation and $\theta$ is the angle of incidence of the seismic pulse waveform with respect to the normal incidence at the subsurface reflecting point along the boundary with the underlying medium, and
   f = frequency of the seimic pulse waveform.

* * * * *